US009069520B2

(12) United States Patent
Lin

(10) Patent No.: US 9,069,520 B2
(45) Date of Patent: Jun. 30, 2015

(54) SECURING DEVICE, AND ASSEMBLY INCLUDING THE SECURING DEVICE AND A HEAT DISSIPATING MODULE

(71) Applicant: AOPEN INC, New Taipei (TW)

(72) Inventor: Shih-Chieh Lin, New Taipei (TW)

(73) Assignee: AOPEN INC., New Taipei (TW)

( * ) Notice: Subject to any disclaimer, the term of this patent is extended or adjusted under 35 U.S.C. 154(b) by 215 days.

(21) Appl. No.: 13/765,749

(22) Filed: Feb. 13, 2013

(65) Prior Publication Data

US 2013/0223006 A1 Aug. 29, 2013

(30) Foreign Application Priority Data

Feb. 29, 2012 (TW) .............................. 101203546 A

(51) Int. Cl.
G06F 1/16 (2006.01)
G06F 1/20 (2006.01)
(52) U.S. Cl.
CPC ... G06F 1/16 (2013.01); G06F 1/20 (2013.01)
(58) Field of Classification Search
USPC ...................... 361/679.583, 679.48
See application file for complete search history.

(56) References Cited

U.S. PATENT DOCUMENTS

| 6,151,214 | A  * | 11/2000 | Yeh ................................ 361/695 |
| 6,236,569 | B1 * | 5/2001  | McEuen ....................... 361/719 |
| 6,381,836 | B1 * | 5/2002  | Lauruhn et al. ................. 29/831 |
| 6,407,919 | B1 * | 6/2002  | Chou ............................. 361/697 |
| 6,449,154 | B1 * | 9/2002  | Yoneyama et al. ............ 361/704 |
| 6,744,630 | B2 * | 6/2004  | Hutchinson et al. ..... 361/679.48 |
| 6,905,353 | B2 * | 6/2005  | Ma et al. ....................... 439/135 |
| 7,333,333 | B2 * | 2/2008  | Zhao et al. .................... 361/700 |
| 7,374,446 | B2 * | 5/2008  | Toda et al. .................... 439/342 |
| 7,815,453 | B2 * | 10/2010 | Szu ................................ 439/331 |
| 8,351,205 | B2 * | 1/2013  | Tang et al. .................... 361/695 |
| 8,834,191 | B2 * | 9/2014  | Yeh et al. ...................... 439/331 |
| 2004/0142585 | A1 * | 7/2004  | Ma et al. ......................... 439/73 |
| 2007/0247806 | A1 * | 10/2007 | Pan .............................. 361/687 |
| 2009/0325404 | A1 * | 12/2009 | Lin et al. ......................... 439/73 |
| 2012/0188711 | A1 * | 7/2012  | Zeng et al. ............... 361/679.58 |

FOREIGN PATENT DOCUMENTS

TW M415553 11/2011

* cited by examiner

Primary Examiner — Lisa Lea Edmonds
(74) Attorney, Agent, or Firm — The Mueller Law Office, P.C.

(57) ABSTRACT

A securing device is adapted to secure a central processing unit to a circuit board. The securing device includes first and second seats secured to the circuit board. The securing device further includes a press member stacked on and pressed against the central processing unit, and having a side edge portion that is connected pivotally to the first seat, and an opposite side edge portion that is adjacent to the second seat. The securing device further includes an engaging rod pressed against the press member, and having one end that is connected pivotally to the second seat and the other end removably engaged with the first seat for securing the central processing unit to the board body.

16 Claims, 7 Drawing Sheets

SECURING DEVICE, AND ASSEMBLY INCLUDING THE SECURING DEVICE AND A HEAT DISSIPATING MODULE

CROSS-REFERENCE TO RELATED APPLICATION

This application claims priority of Taiwanese Patent Application No. 101203546, filed on Feb. 29, 2012, the entire disclosure of which is incorporated herein by reference.

BACKGROUND OF THE INVENTION

1. Field of the Invention

The invention relates to a securing device, and more particularly to a securing device for securing a central processing unit to a circuit board.

2. Description of the Related Art

A conventional securing device for a central processing unit is used to ensure contact between the central processing unit and a pin base of a socket, so as to alleviate the problem that a motherboard cannot be started up due to poor contact. In order to dissipate heat from the central processing unit effectively, a heat dissipating member would be disposed on the securing device and in good contact with the central processing unit.

However, the securing device is adapted to abut against a top surface of a central processing unit. In this case, bolts or screws are required to fasten the securing device to the central processing unit. During the securing process, screw holes of relevant elements need to be aligned for the bolts to pass therethrough. Thus, size mismatch between the size of the screw holes and that of the bolts or screws, misalignment of the screw holes, and improper force application during the engagement between the bolts or screws and the screw holes may affect the securing of the central processing unit.

SUMMARY OF THE INVENTION

Therefore, an object of the present invention is to provide a securing device for securing a central processing unit, which can alleviate the abovementioned drawbacks.

Accordingly, a securing device of this invention is adapted to secure a central processing unit to a circuit board. The circuit board includes a board body and a socket disposed on the board body. The socket has a first side and a second side opposite to the first side. The central processing unit is disposed between the first side and the second side of the socket. The securing device comprises:

a first seat adapted to be secured to the board body at a position adjacent to the first side of the socket;

a second seat adapted to be secured to the board body at a position adjacent to the second side of the socket;

a press member adapted to be stacked on and pressed against a portion of one side of the central processing unit opposite to the socket, and having a side edge portion that is connected pivotally to the first seat, and an opposite side edge portion that is adjacent to the second seat; and an engaging rod pressed against a portion of one side of the press member opposite to the central processing unit, and having one end that is connected pivotally to the second seat and the other end removably engaged with the first seat so as to secure the central processing unit to the board body.

BRIEF DESCRIPTION OF THE DRAWINGS

Other features and advantages of the present invention will become apparent in the following detailed description of one embodiment with reference to the accompanying drawings, of which.

DETAILED DESCRIPTION OF THE EMBODIMENT

Figure 1:
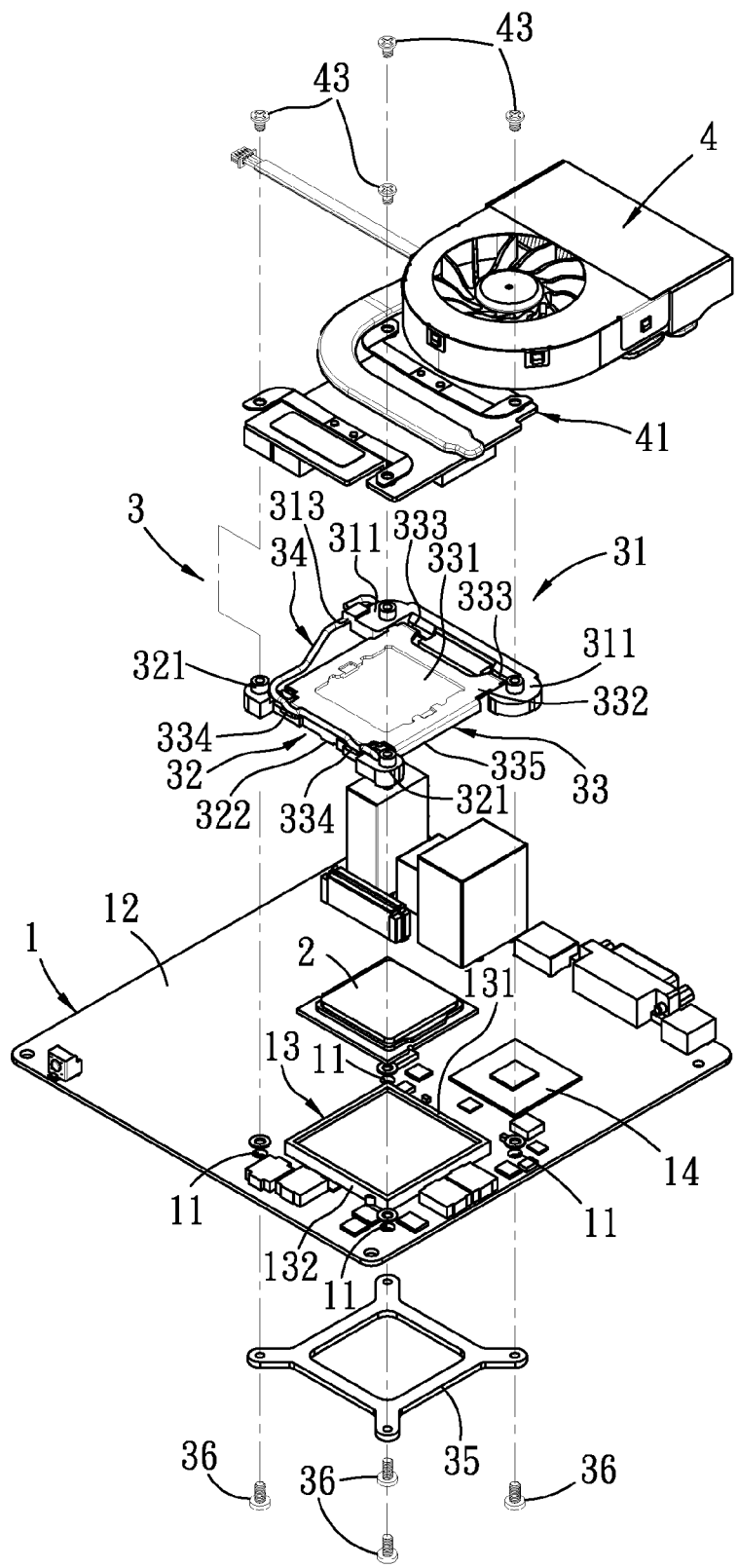
FIG. 1 is an exploded perspective view of an embodiment of an assembly of a securing device and a heat dissipating module according to the present invention.
Figure 2:
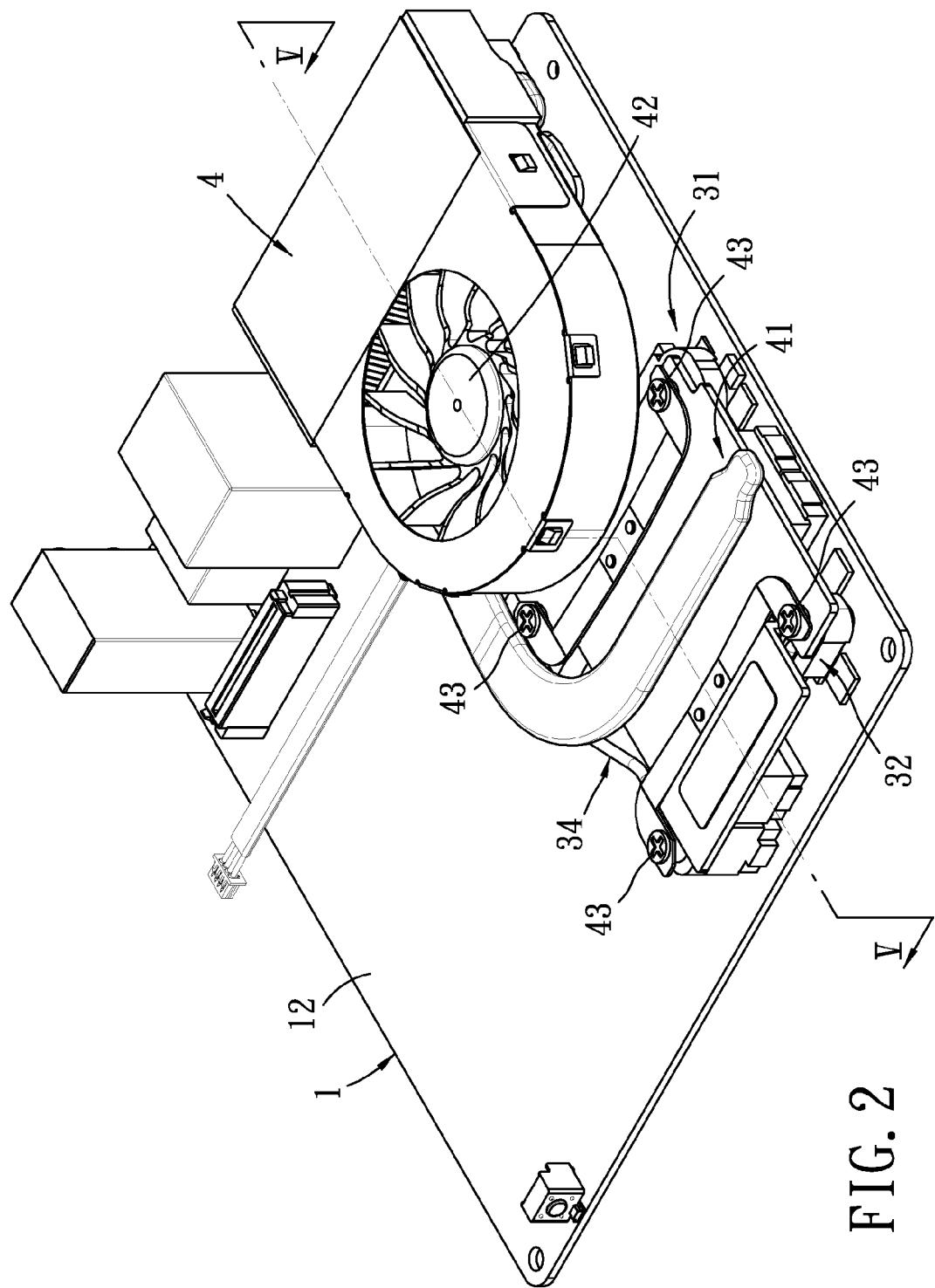
FIG. 2 is an assembled perspective view of the embodiment.

FIGS. 1 and 2 illustrate an embodiment of an assembly of a securing device 3 and a heat dissipating module 4 according to the present invention. The assembly is adapted for use in a computer host (not shown), and is disposed on a circuit board 1 for securing a central processing unit 2 to the circuit board 1. The circuit board 1 includes a board body 12, a socket 13 disposed on the board body 12, and a north bridge chip 14 disposed on the board body 12 and spaced apart from the socket 13. The board body 12 is formed with four securing holes 11. The socket 13 has a first side 131 and a second side 132 opposite to the first side 131. The central processing unit 2 is electrically connected to the socket 13 and is disposed between the first side 131 and the second side 132 of the socket 13. The assembly comprises a securing device 3 and a heat dissipating module 4.

The securing device 3 includes a first seat 31, a second seat 32 parallel to and spaced apart from the first seat 31, a press member 33, an engaging rod 34, four securing members 36, and a bottom member 35.

Figure 3:
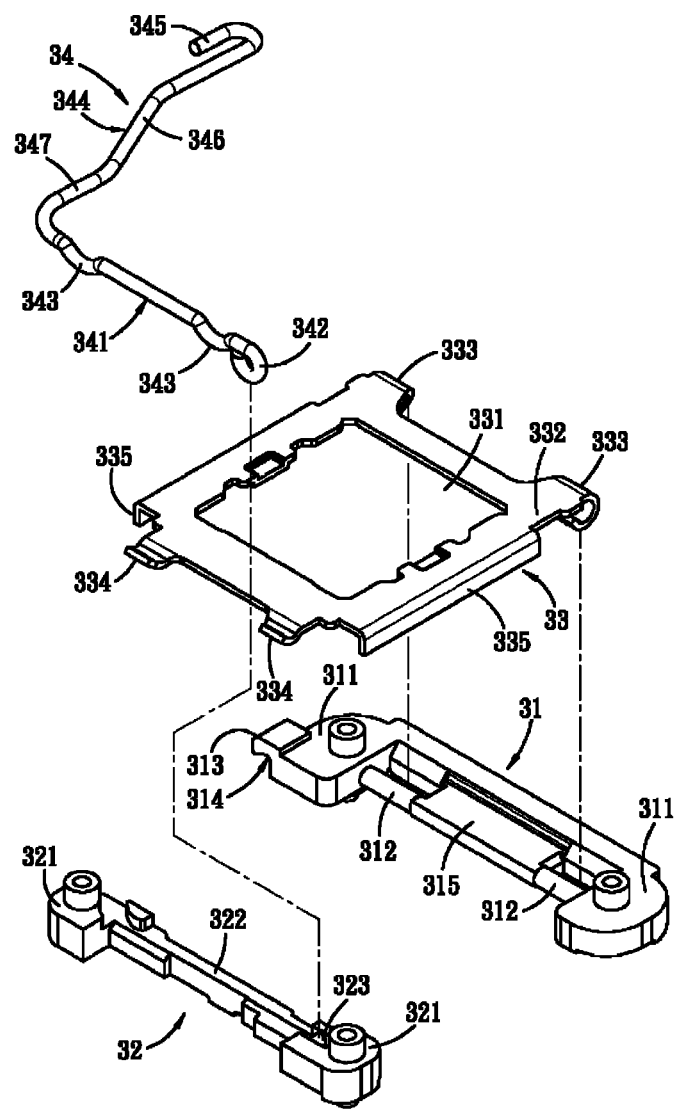
FIG. 3 is an exploded perspective view of a first seat, a second seat, a press member and an engaging rod of the securing device of the embodiment.
Figure 4:
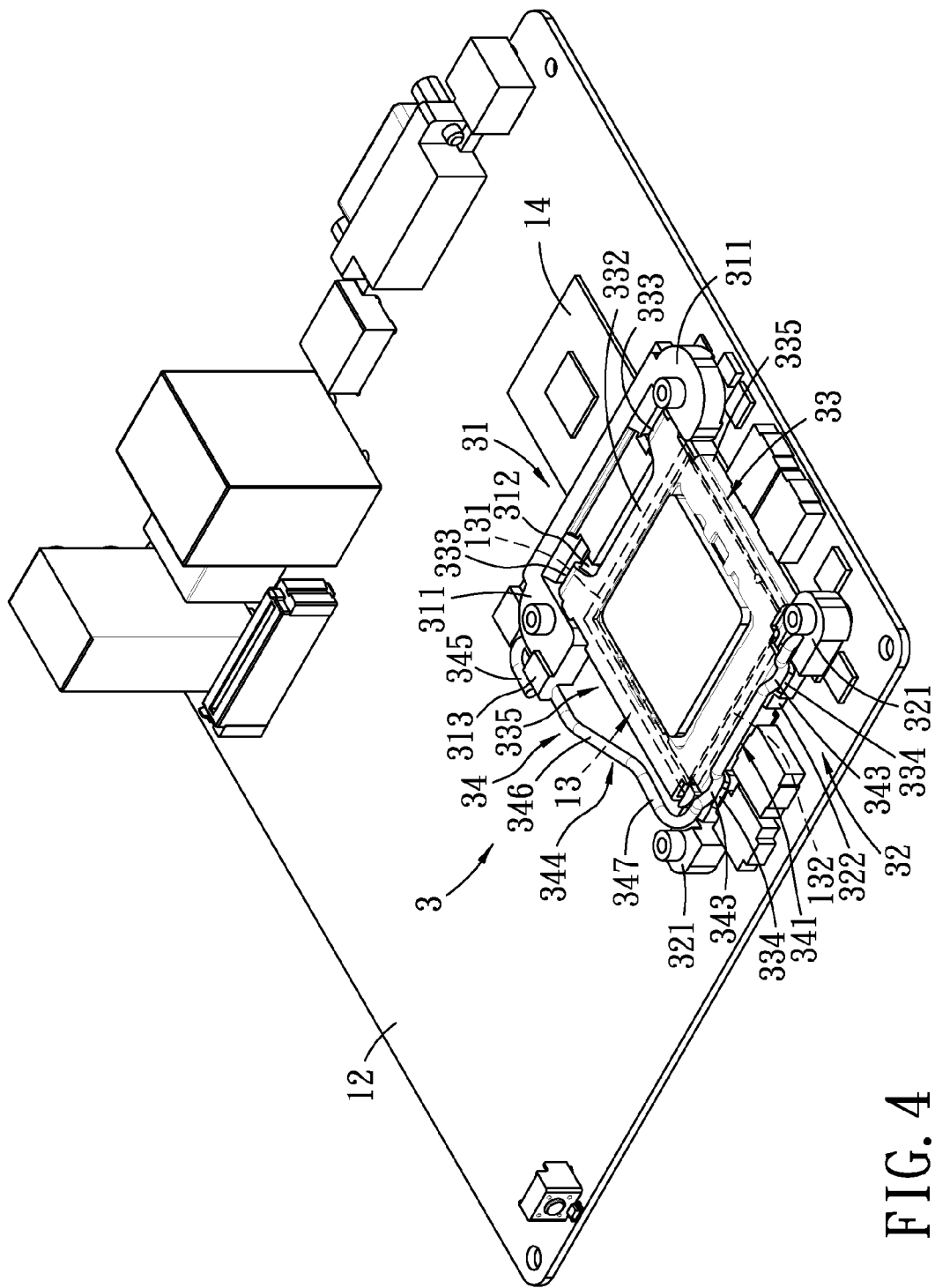
FIG. 4 is an assembled perspective view illustrating a central processing unit is secured by the securing device to a circuit board.

It should be noted that the heat dissipating module 4 is omitted in FIG. 4 for clarity of illustration. Referring to FIGS. 3 and 4, the first and second seats 31, 32 are secured to the board body 12, and are adjacent respectively to the first and second sides 131, 132 of the socket 13. The first seat 31 has two first securing portions 311 spaced apart from each other, two pivot axle portions 312 connected between the first securing portions 311, and a protrusion 315 connected between the two pivot axle portions 312. Only one pivot axle portion 312 maybe employed in other embodiments of this invention. Two of the securing members 36 extend upwardly and respectively through corresponding two of the securing holes 11 and are engaged respectively with the first securing portions 311 to secure the first seat 31 to the board body 12. The first seat 31 further has a positioning portion 313 that protrudes from one of the first securing portions 311 away from the other one of the first securing portions 311, and that has a side surface facing the board body 12 and formed with a positioning groove 314.

The second seat 32 has two second securing portions 321 spaced apart from each other, and a connecting portion 322 connected between the second securing portions 321. One of the second securing portions 321 that is distal from the positioning portion 313 is provided with a pivot axle component 323 at one side thereof adjacent to the other one of the second securing portions 321. The pivot axle component 323 is perpendicular to the connecting portion 322. The other two of the securing members 36 extend upwardly and respectively through corresponding two of the securing holes 11 and are engaged respectively with the second securing portions 321 to secure the second seat 32 to the board body 12.

The press member 33 includes a main body 332 stacked on and pressed against a part of one side of the central processing unit 2 opposite to the socket 13, and formed with a through hole 331 for exposure of the other part of the central processing unit 2. The press member 33 further includes opposite first and second side edge portions that are connected respectively to opposite ends of the main body 332 and that are adjacent respectively to the first and second seats 31, 32. In this embodiment, the first side edge portion is configured as two spaced-apart pivot segments 333 protruding from a corresponding end of the main body 332 and surrounding respectively the pivot axle portions 312, so that the press member 33 is connected pivotally to the first seat 31. The second side edge portion is configured as two spaced-apart pressed plates 334 that are curved, that protrude from a corresponding end of the main body 332, and that are adjacent to the connecting portion 322. The press member 33 further includes two lateral walls 335 extending downwardly and respectively from two opposite sides of the main body 332 that are connected between the pivot segments 333 and the pressed segments 334 towards the board body 12.

The engaging rod 34 is approximately L-shaped, and has a first rod body 341 connected pivotally to the second seat 32, and a second rod body 344 extending perpendicularly from the first rod body 341. The first rod body 341 has a pivot hook 342 connected pivotally to the pivot axle component 323 at one end thereof, and two press sections 343 for pressing removably and respectively against the pressed plates 334. The number of the corresponding pair of the press section 343 and the pressed plate 334 may vary in other embodiments of this invention. The second rod body 344 has an engaging hook 345 removably engaged with the positioning portion 313, a connecting section 347 perpendicularly connected to the first rod body 341, and an inclined section 346 with two ends respectively connected to the connecting section 347 and the engaging hook 345. Specifically, a portion of the engaging hook 345 extends through the positioning groove 314, and the inclined section 346 is inclined from the connecting section 347 in a direction away from the press member 33.

Figure 5:
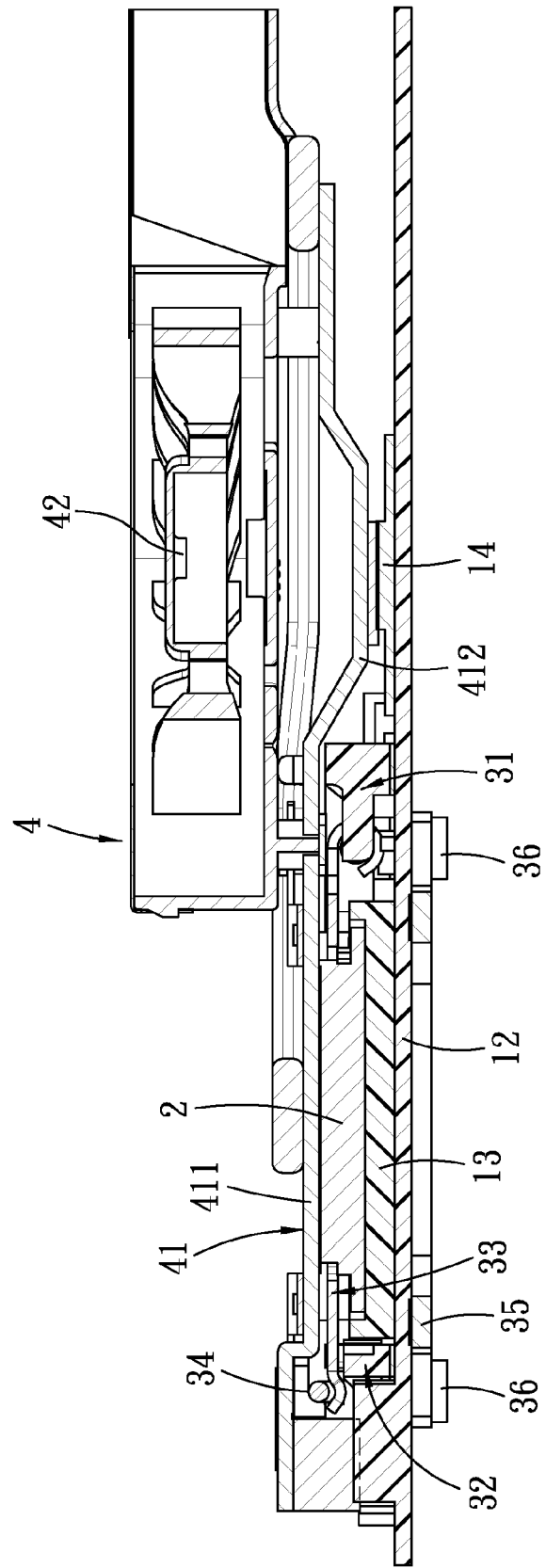
FIG. 5 is a sectional view of the embodiment taken along Line V-V in FIG. 2.

Referring to FIGS. 1 and 5, the heat dissipating module 4 includes a base member 41 pressed against the central processing unit 2, a heat dissipating member 42 disposed on the base member 41, and a plurality of locking members 43 locking the base member 41 to the first seat 31 and the second seat 32. The base member 41 includes a plate portion 411 pressed against the other part of the central processing unit 2 which is exposed through the through hole 331 of the press member 33, and a recessed portion 412 connected to the plate portion 411 and pressed against the north bridge chip 14. The heat dissipating member 42 is disposed on the recessed portion 412.

The bottom member 35 is adhered to one side of the board body 12 opposite to the socket 13, and the securing members 36 secure the bottom member 35, the first seat 31 and the second seat 32 to the board body 12.

Figure 6:
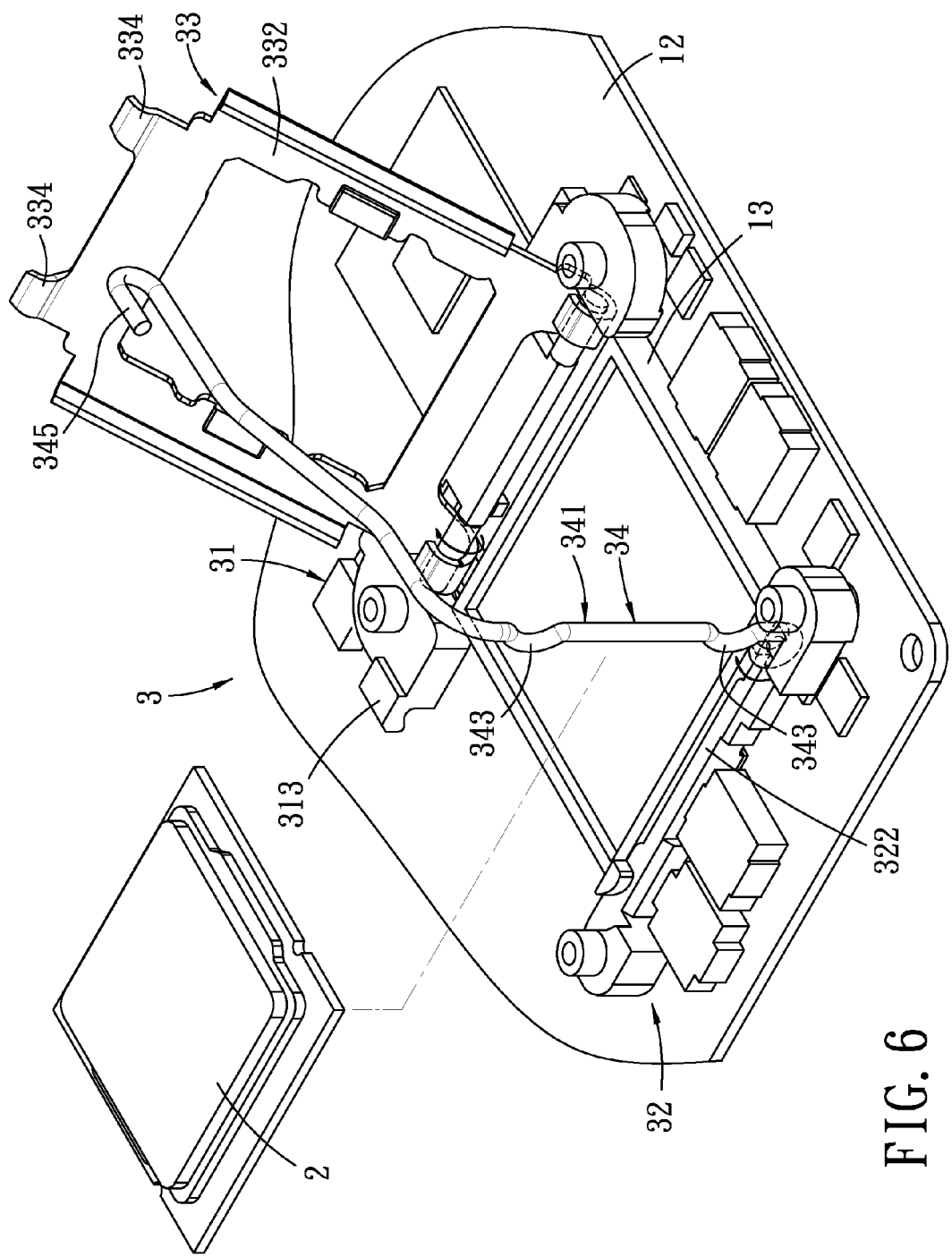
FIG. 6 is a fragmentary partly exploded perspective view illustrating that an engaging rod is detached from a press member, and the press member forms an angle of about 130° with the circuit board.
Figure 7:
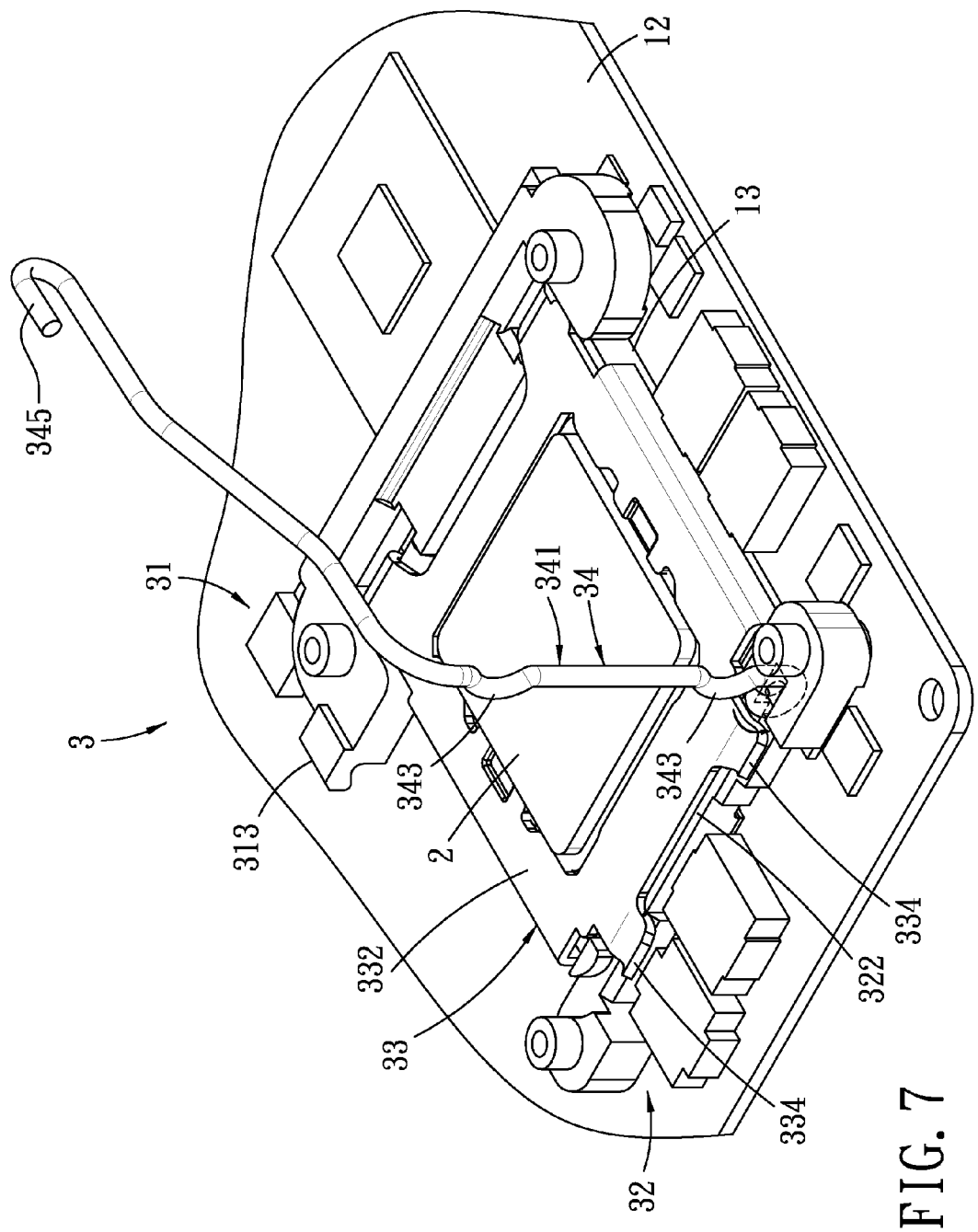
FIG. 7 is a fragmentary perspective view illustrating that the press member is stacked on and pressed against the central processing unit.

FIGS. 4, 6 and 7 illustrate the operation of the securing device 3 for securing the central processing unit 2. First, the engaging hook 345 of the engaging rod 34 is disengaged from the positioning portion 313 of the first seat 31, and then the engaging rod 34 is pivoted in a direction away from the positioning portion 313 until the first rod body 341 is perpendicular to the board body 12. At this time, since the pressed segments 334 of the press member 33 are not pressed by the press sections 343 of the first rod body 341, the press member 33 can be pivoted in a direction away from the connecting portion 322 until the main body 332 forms an angle of about 130° with the board body 12 (as shown in FIG. 6). Next, after the central processing unit 2 is mounted on the socket 13, as shown in FIG. 7, the press member 33 is pivoted towards the connecting portion 322, so that the main body 332 is stacked on and pressed against the central processing unit 2. Finally, the engaging rod 34 is pivoted towards the positioning portion 313, and the engaging hook 345 is engaged with the positioning portion 313 of the first seat 31. At this time, as shown in FIG. 4, the press sections 343 of the first rod body 341 press respectively against the pressed plates 334 of the press member 33, thereby securing the central processing unit 2 on the socket 13.

Compared to the prior art of an integrally formed securing device which has to be fastened and unfastened by applying and removing bolts or screws, the abovementioned drawbacks of the prior art can be avoided using the securing device 3 of this invention.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A securing device adapted to secure a central processing unit to a circuit board, the circuit board including a board body and a socket that is disposed on the board body, the socket having a first side and a second side opposite to the first side, the central processing unit being disposed between the first side and the second side of the socket, said securing device comprising:

a first seat adapted to be secured to the board body at a position adjacent to the first side of the socket;

a second seat adapted to be secured to the board body at a position adjacent to the second side of the socket;

a press member adapted to be stacked on and pressed against a portion of one side of the central processing unit opposite to the socket, and having a side edge portion that is connected pivotally to said first seat, and an opposite side edge portion that is adjacent to said second seat; and an engaging rod pressed against a portion of one side of said press member opposite to the central processing unit, and having one end that is connected pivotally to said second seat and the other end removably engaged with said first seat so as to secure the central processing unit to the board body;

wherein said securing device further comprises a plurality of securing members, each of said securing members being adapted to extend through a corresponding securing holes formed on the board body so as to secure said first seat and said second seat to the board body;

wherein said first seat has two first securing portions spaced apart from each other and engaged respectively with two of said securing members, said second seat having two second securing portions that are spaced apart from each other and that are engaged respectively with another two of said securing members, said first seat further having a positioning portion that protrudes from one of said first securing portions away from the other one of said first securing portions, and that has a side surface adapted to face the board body and formed with a positioning groove, one of said second securing portions of said second seat that is distal from said positioning portion being provided with a pivot axle component on one side thereof adjacent to the other one of said second securing portions, said one end of said engaging rod being formed with a pivot hook that is connected pivotally to said pivot axle component, said other end of said engaging rod being formed with an engaging hook that is engaged removably with said positioning portion;

wherein said engaging rod has a first rod body formed with said pivot hook, and a second rod body extending perpendicularly from said first rod body, said first rod body removably pressed against said press member, said second rod body being formed with said engaging hook; and wherein said second rod body has a connecting section perpendicularly connected to said first rod body, and an inclined section with two ends respectively connected to said connecting section and said engaging hook, said inclined section being inclined from said connecting section in a direction away from said press member.

2. The securing device as claimed in claim 1, wherein said press member includes a main body adapted to be stacked on the portion of the side of the central processing unit, and two lateral walls extending respectively from opposite sides of said main body that interconnect said two side edge portions toward the board body.

3. The securing device as claimed in claim 1, wherein said first seat has two first securing portions spaced apart from each other and engaged respectively with two of said securing members, and at least one pivot axle portion connected between said first securing portions, said second seat having two second securing portions that are spaced apart from each other and that are engaged respectively with another two of said securing members, and a connecting portion that is connected between said second securing portions, said side edge portion of said press member that is pivoted to said first seat being configured as at least one pivot segment surrounding said at least one pivot axle portion, said opposite side edge portion of said press member that is adjacent to said second seat being configured as at least one curved pressed segment that protrudes from a main body and that is adjacent to said connecting portion, said engaging rod abutting against said at least one pressed segment.

4. The securing device as claimed in claim 3, wherein said engaging rod includes a first rod body connected pivotally to said second seat, and a second rod body extending perpendicularly from said first rod body and engaged removably with said first seat, said first rod body having a press section that is removably pressed against said pressed segment of said press member.

5. The securing device as claimed in claim 1, further comprising a bottom member adapted to be adhered to one side of the board body opposite to the socket, said securing members being adapted to secure said bottom member, said first seat and said second seat to the board body.

6. An assembly of a securing device and a heat dissipating module said assembly being adapted to secure a central processing unit to a circuit board, the circuit board including a board body and a socket disposed on the board body, the socket having a first side and a second side opposite to the first side, the central processing unit being disposed between the first side and the second side of the socket, said assembly comprising:

a securing device including
a first seat that is adapted to be secured to the board body at a position adjacent to the first side of the socket,
a second seat that is adapted to be secured to the board body at a position adjacent to the second side of said socket,
a press member that is adapted to be stacked on and pressed against a portion of one side of the central processing unit opposite to the socket, and that has a side edge portion connected pivotally to said first seat, and an opposite side edge portion adjacent to said second seat, and
an engaging rod that is pressed against a portion of one side of said press member opposite to the central processing unit, and that has one end connected pivotally to said second seat and the other end removably engaged with said first seat so as to secure the central processing unit to the board body; and
a heat dissipating module including a base member that is adapted to be pressed against the central processing unit, and a plurality of locking members that lock said base member to said first seat and said second seat.

7. The assembly as claimed in claim 6, wherein said press member includes a main body adapted to be stacked on the portion of the side of the central processing unit, and two lateral walls extending respectively from opposite sides of said main body that interconnect said two side edge portions toward the board body.

8. The assembly as claimed in claim 6, said circuit board further including a north bridge chip that is disposed on the board body and that is spaced apart from the socket, wherein said base member has a plate portion that is adapted to be pressed against the central processing unit and a recessed portion connected to said plate portion and adapted to be pressed against the north bridge chip, said heat dissipating module further including a heat dissipating member that is disposed on said recessed portion.

9. The assembly as claimed in claim 8, wherein said press member further has a through hole adapted for exposure of the other part of the central processing unit, said plate portion of said base member being adapted to be pressed against the other part of the central processing unit.

10. The assembly as claimed in claim 6, the board body of the circuit board being formed with a plurality of securing holes, wherein said securing device further includes a plurality of securing members, each of said securing members being adapted to extend through a respective one of said securing holes so as to secure said first seat and said second seat to the board body.

11. The assembly as claimed in claim 10, wherein said first seat has two first securing portions spaced apart from each other and at least one pivot axle portion connected between said first securing portions, said first securing portions being engaged respectively with two of said securing members and engaged respectively with two of said locking members, said second seat having two second securing portions that are spaced apart from each other and a connecting portion that is connected between said second securing portions, said second securing portions being engaged respectively with another two of said securing members and engaged respectively with another two of said locking members, said side edge portion of said press member that is pivoted to said first seat being configured as at least one pivot segment surrounding said at least one pivot axle portion, said opposite side edge portion of said press member that is adjacent to said second seat being configured as at least one curved pressed segment that protrudes from a main body and that is adjacent to said connecting portion, said engaging rod abutting against said at least one pressed segment.

12. The assembly as claimed in claim 10, wherein said first seat includes two first securing portions spaced apart from each other, engaged respectively with two of said securing members and engaged respectively with two of said locking members, said second seat having two second securing portions that are spaced apart from each other, that are engaged respectively with another two of said securing members and that are engaged respectively with another two of said locking members , said first seat further having a positioning portion protruding from one of said first securing portions away from the other one of said first securing portions, and that has a side surface adapted to face the board body and formed with a positioning groove therein, one of said second securing portions of said second seat that is distal from said positioning portion being provided with a pivot axle component on one side thereof adjacent to the other one of said second securing portions, said one end of said engaging rod being formed with a pivot hook that is connected pivotally to said pivot axle component, said other end of said engaging rod being formed with an engaging hook that is engaged removably with said positioning portion.

13. The assembly as claimed in claim 11, wherein said engaging rod includes a first rod body connected pivotally to said second seat, and a second rod body extending perpendicularly from said first rod body and engaged removably with said first seat, said first rod body having a press section that is removably pressed against said pressed segment of said press member.

14. The assembly as claimed in claim 12, wherein said engaging rod has a first rod body formed with said pivot hook, and a second rod body extending perpendicularly from said first rod body, said first rod body removably pressed against said press member, said second rod body being formed with said engaging hook.

15. The assembly as claimed in claim 14, wherein said second rod body has a connecting section perpendicularly connected to said first rod body, and an inclined section with two ends respectively connected to said connecting section and said engaging hook, said inclined section being inclined from said connecting section in a direction away from said press member.

16. The assembly as claimed in claim 10, wherein said securing device further includes a bottom member adapted to be adhered to one side of the board body opposite to the socket, said securing members being adapted to secure said bottom member, said first seat and said second seat to the board body.

\* \* \* \* \*